United States Patent [19]

Yeager

[11] Patent Number: 4,907,837
[45] Date of Patent: Mar. 13, 1990

[54] INSECT DIVERTER FOR AUTOMOTIVE VEHICLE WINDSHIELD

[76] Inventor: Donald A. Yeager, 707 Park St., Bellevue, Iowa 52031

[21] Appl. No.: 315,994

[22] Filed: Feb. 27, 1989

[51] Int. Cl.$^4$ .............................................. B60J 1/20
[52] U.S. Cl. ..................................................... 296/91
[58] Field of Search ....................................... 296/91, 1

[56] References Cited

U.S. PATENT DOCUMENTS

| 2,223,378 | 12/1940 | Martin | 296/91 |
| 2,754,147 | 7/1956 | Dell | 296/91 |
| 2,963,315 | 12/1960 | Wilsdorf, Sr. | 296/91 |
| 3,647,256 | 3/1972 | Cox | 296/91 |

Primary Examiner—Robert R. Song
Attorney, Agent, or Firm—Henderson & Sturm

[57] ABSTRACT

An attachment for the windshield of an automotive vehicle windshield operative by vibrations induced by airflow through a configured passage to divert flying insects away from the windshield as the vehicle travels forwardly. The attachment is in the form of a block-like body affixed as by adhesive to an upper, central, frontal part of the windshield. The body has upper and lower ends, the latter having an air inlet to a passage that exits at the upper end of the body. The passage is interiorly configured to generate the vibrations that are effective to divert the flying insects.

5 Claims, 1 Drawing Sheet

INSECT DIVERTER FOR AUTOMOTIVE VEHICLE WINDSHIELD

BACKGROUND AND SUMMARY OF THE INVENTION

The spattering of windshields of automobiles, trucks and like vehicles by flying insects is a common problem and various devices have been developed, with some degree of success but at substantial cost, in attempts to solve the problem to some extent, such as deflectors or screens affixed to a forward part of the vehicle hood. According to the present invention, substantially greater success is achieved by the provision of a simple, low-cost diverter operating on the principle of creating airflow-induced vibrations effective to divert substantial numbers of flying insects out of the path of the vehicle windshield. It is an object of the invention to provide a diverter in the form of a block-like member affixable, as by a suitable adhesive, to the upper front face of the windshield and having an air passage therethrough configured to create vibrations resulting from sound waves effective to divert the flying insects. A feature of the invention is the configuration of the passage in such manner as to generate the sound waves resulting from air rushing through the passage, as by giving the passage a funnel-shaped inlet end, especially in conjunction with a plurality of annular grooves uphill from the funnel and concentric with the major portion of the passage, which is preferably of circular section.

Other features and advantages of the invention will become apparent as a preferred embodiment of the invention is disclosed in the ensuing description and accompanying drawings.

DETAILED DESCRIPTION OF A PREFERRED EMBODIMENT OF THE INVENTION

Figure 1:
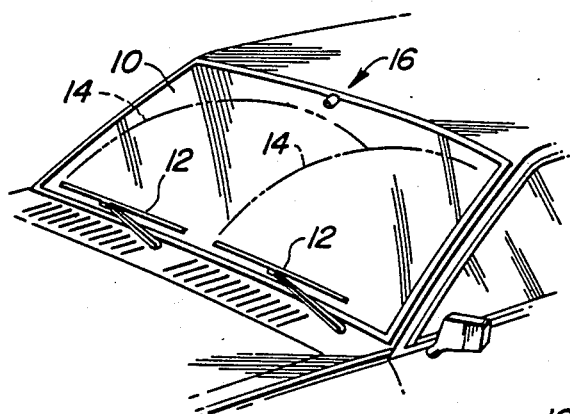
FIG. 1 is a fragmentary perspective illustrating the use of the diverter.
Figure 5:
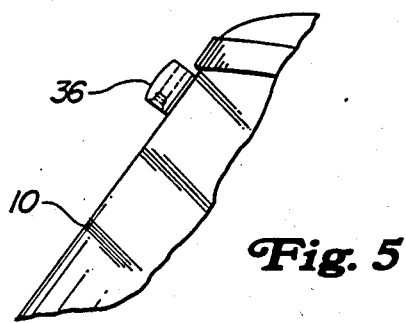
FIG. 5 is a partial elevation showing the mounting of the diverter.
Figure 3:
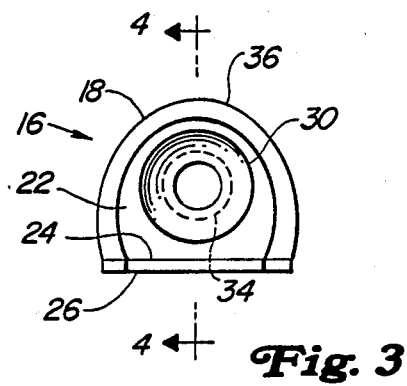
FIG. 3 is a bottom elevation of the diverter.

Reference is had first to FIG. 1, wherein the numeral (10) designates the windshield of a typical automotive vehicle. The vehicle is shown as having a pair of conventional wipers (12) operative in typical arcuate areas (14). The numeral (16) is applied to the diverter per se, which may be made from any suitable plastic having the characteristics of long life and low cost, considering its environment as exposed to weather, road film, etc. because of its affixation to an upper, central portion of the front face of the windshield (FIGS. 1 and 5).

The diverter is generally of block-like configuration made up of a body (18) having upper and lower ends (20) and (22), respectively, and a base (24) which is preferably coated with an adhesive covered by a removable protective cover (26). In use, the cover is peeled off and the diverter is adhered to the windshield clear of the wiper areas (14) and after the windshield has been cleaned of film, dirt and the like.

Figure 2:
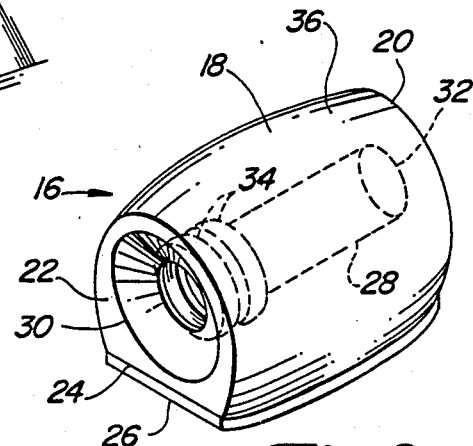
FIG. 2 is an enlarged perspective of the diverter.
Figure 4:
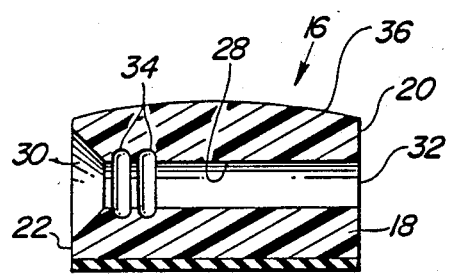
FIG. 4 is a section on the line 4—4 of FIG. 3.

The diverter is provided interiorly with a through passage (28) having an air inlet (30) at the bottom end (22) and air outlet (32) at the upper end. As best seen in FIGS. 2 and 4, the inlet end of the passage is funnel shaped, having its larger diameter facing downwardly (or downhill, considered with respect to the forward and downward slope of a conventional windshield) and its smaller end leading to the lower end of the passage which has its major length of circular section. The passage is molded in the body as part of the production of the diverter.

As a further part of the passage configuration, in conjunction with the funnel-shaped inlet (30), is a pair of annular grooves (34) just rearwardly of the smaller part of the funnel and of equal diameter. These grooves are concentric with the major portion of the passage and are closely spaced part axially of the passage. As the vehicle travels forwardly, air enters the passage at the inlet (30) and rushes through the passage, exiting at the outlet and sound waves are created by the grooves as the air rushes through the passage, causing the emission of vibrations noisome to the nervous systems of the insects to such extent that most if not all of the flying insects are diverted out of the path of the windshield.

The shape of the diverter is preferably such that its front part (36) is rounded so as to minimize resistance to airflow as the vehicle travels.

As will be seen from the foregoing, the diverter is simple in construction and design and is easily and inexpensively produced from lost-cost and readily available materials. In a preferred design, the diverter is about one inch from top to bottom (between ends (30) and (32) and about one-half inch between its base and its curved front (36). The diameter of the major part of the passage (28) may be in the order of one-eighth of an inch, the larger diameter of the inlet at about five-sixteenths to three-eighths of an inch with the grooves about the same diameter as the larger end of the funnel at (30).

Features and advantages other than those pointed out herein will become apparent to those versed in the art, as will many modifications of the preferred embodiment disclosed, all without departure from the spirit and scope of the invention.

I claim:

1. An insect diverter for attachment to an upper, central, frontal portion of the windshield of an automotive vehicle, comprising a block-like member having a flat rear face adapted for affixation to the windshield and a body projecting forwardly from the base and having upper and lower ends, said body including a through passage extending from end to end, said passage having an air inlet at its lower end and an air outlet at its upper end, said passage being configured to cause vehicle-travel-induced airflow through the passage to emit vibrations effective to divert flying insects to turn away from the path of the vehicle.

2. The diverter according to claim 1, in which at least part of the passage configuration includes a funnel-shaped passage portion at the air inlet in which the layer portion of the funnel is at the bottom of the body.

3. The diverter according to claim 2, in which a further part of the passage comprises a plurality of annular grooves concentric with and larger than the passage and disposed closely upwardly from the air inlet and in axially spaced apart relation to each other.

4. The diverter according to claim 1, in which a further part of the passage comprises a plurality of annular grooves concentric with and larger than the passage and disposed closely upwardly from the air inlet and in axially spaced apart relation to each other.

5. The diverter according to claim 1, in which a major portion of the passage is a bore of uniform diameter and a minor portion of the passage is at the inlet and is of larger diameter than the major portion of the passage.

* * * * *